US005941673A

United States Patent [19]

Hayakawa et al.

[11] Patent Number: 5,941,673

[45] Date of Patent: Aug. 24, 1999

[54] LOADING AND UNLOADING APPARATUS FOR SHEET MATERIAL AND METHOD THEREOF AND PALLET USED FOR THE APPARATUS

[75] Inventors: Minoru Hayakawa, Irvine, Calif.; Toshiro Takahashi, Kanagawa, Japan

[73] Assignee: Amada Metrecs Company, Limited, Kanagawa, Japan

[21] Appl. No.: 09/027,181

[22] Filed: Feb. 20, 1998

[30] Foreign Application Priority Data

Feb. 21, 1997 [JP] Japan .................................... 9-038193

[51] Int. Cl.[6] .............................. B65H 1/00; B65B 21/02

[52] U.S. Cl. ............................................ 414/416; 414/225

[58] Field of Search .................................... 414/416, 225; 271/157, 158

[56] References Cited

U.S. PATENT DOCUMENTS

| | | | |
|---|---|---|---|
| 5,120,178 | 6/1992 | Ito | 414/225 |
| 5,358,375 | 10/1994 | Kawada et al. | 414/277 |
| 5,475,604 | 12/1995 | Nagamatsu | 364/478 |

*Primary Examiner*—William E. Terrell
*Assistant Examiner*—K W Broun
*Attorney, Agent, or Firm*—Greenblum & Bernstein P.L.C.

[57] ABSTRACT

A sheet material loading and unloading apparatus comprises: a frame having a lower frame and an upper frame attached to the lower frame in such a manner as to freely move to a vertical direction; a vertically movable lifter disposed within the frame; a truck going in and out over the lifter; a plurality of pallets supporting a material or a processed product; a plurality of escapable loading positioning members being disposed in the upper frame; a plurality of escapable material supporting members being disposed in the upper frame; and a carriage being disposed within the frame.

7 Claims, 16 Drawing Sheets

31
55
57
49A
X
X
Y
Y
49
29
47
53
53
33

33
67
71
73
67B
67A
V
81
75
85
73
71
73
67B
73
Ws
69
WF
73
69
33
71
67A
67
71
73
X
Y
Y
X

Ws
Ws
85
81
75
79
67
33
31
X
X 35
25
27
$W_S(W_F)$
11
1
23
15
19
21
13
3
9
5
7
15
X
Y
Y
X

P
P
25
27
29
17
15
3
1
X
X

WAITING POSITION SENSOR LS
SPEED REDUCTION STARTING POSITION
SPEED REDUCTION SENSOR LS
STOP POSITION SENSOR LS
START SPEED REDUCTION IF BOTH SENSORS ARE ON
LOW SPEED
HIGH SPEED
SPEED REDUCTION
CLOSE CLAMP IF STOPPED
STATE IN THE PALLET
X
X
S1
S2
S3
117A
117
125
119
Ws
23
15
21

LOADING AND UNLOADING APPARATUS FOR SHEET MATERIAL AND METHOD THEREOF AND PALLET USED FOR THE APPARATUS

BACKGROUND OF THE INVENTION

1. Field of the Invention

The present invention relates to a sheet material loading and unloading apparatus for loading a material to a sheet material processing device or unloading a processed product, and a method thereof and a pallet used for the apparatus.

2. Description of the Related Art

Conventionally, a sheet material loading and unloading apparatus for loading a material to a sheet material processing device, for example, a turret punch press and a laser beam machine or unloading a processed product is normally structured such as to supply a material from one side of the sheet material processing device and to take out the product from the opposite side thereof.

However, in the conventional sheet material loading and unloading apparatus for supplying the material to the sheet material processing device or unloading the processed product therefrom mentioned above, there is a problem that a large space is necessary for receiving the material and the product in separate locations or in separate places.

SUMMARY OF THE INVENTION

The present invention has been achieved with such points in view.

It therefore is an object of the present invention to provide a sheet material loading and unloading apparatus which receives a material and a product in pallets located and piled on same place, so that the apparatus can make a space-save by a size of the apparatus nearly equal to a size of the sheet material, thereby improving an operational characteristic, and to provide a method thereof and a pallet using the product.

In order to achieve the object mentioned above, in accordance with a first aspect of the present invention, there is provided a sheet material loading and unloading apparatus comprising: a frame having a lower frame and an upper frame attached to the lower frame in such a manner as to freely move to a vertical direction, the frame being to be located in one side of a sheet material processing device; a vertically movable lifter disposed within the frame; a truck going in and out over the lifter; a plurality of pallets supporting a material to be processed in the sheet material processing device or a processed product having been processed which are vertically moved by the lifter, the pallets being disposed on the truck; a plurality of escapable loading positioning members being disposed in the upper frame, the loading positioning member separating and supporting a pallet disposed at a desired position among a plurality of the piled pallets by the lifter; a plurality of escapable material supporting members being disposed in the upper frame, the material supporting member separating and supporting a pallet disposed immediately above the pallet at the desired position by the lifter; and a carriage being disposed within the frame, the carriage having a plurality of clamps gripping the material or the processed product mounted on the pallet supported by the loading positioning member, the clamps freely moving in a direction close to or apart from the sheet material processing device.

Accordingly, after the pallet disposed immediately above the pallet at the desired position on the truck is supported by the material supporting member and the pallet at the desired position is supported by the loading positioning member, the material mounted on the pallet at the desired position is gripped by the clamp disposed in the carriage so as to be loaded to the sheet material processing device, and the processed product is gripped by the clamp disposed in the carriage and transferred to an empty pallet so as to be received in the same pallet.

Accordingly, since the material and the product are received in the same pallet, a space for the apparatus can be reduced and a structure thereof can be made simple, so that a cost can be significantly reduced in comparison with the conventional apparatus.

In accordance with a second aspect of the present invention, there is provided a sheet material loading and unloading apparatus as recited in the first aspect, in which the frame is disposed near a forward movement end of a movable table provided in the sheet material processing device; and the movable table supports the sheet material and freely moves to forward and rearward directions.

Accordingly, since the sheet material loading and unloading apparatus is disposed near the forward movement end of the movable table, the sheet material loading and unloading apparatus does not obstruct the way at a time of being manually moved and a maintenance, so that an operability can be improved.

In accordance with a third aspect of the present invention, the sheet material loading and unloading apparatus as recited in the first aspect, further comprising: a cover surrounding the upper frame disposed in the frame in such a manner as to freely move to a vertical direction.

Accordingly, since the upper frame is surrounded by the cover, the apparatus is not exposed, so that a safety can be improved and an attractive appearance can be obtained.

In accordance with a fourth aspect of the present invention, there is provided a sheet material loading and unloading apparatus as recited in the first or third aspect, in which when the upper frame is not operated an upper surface of the cover is positioned below a pass line where the material or the processed product passes.

Accordingly, since the upper surface of the cover is below the pass line at a time of not being operated, the cover upper surface can be used as a table, so that an operability can be improved.

In accordance with a fifth aspect of the present invention, there is provided a sheet material loading and unloading apparatus as recited in the first aspect, further comprising: a pin portion having a pallet supporting portion for supporting the pallet, the pin portion being disposed in a front end of the material supporting member and the loading positioning member, wherein the pin portion is constituted to be moved in forward and rearward directions by a hydraulic cylinder.

Accordingly, the material supporting member and the loading positioning member move the pin portion by the hydraulic cylinder so as to support the pallet or remove the support, so that the pallet can be securely supported by a remote control.

In accordance with a sixth aspect of the present invention, there is provided a sheet material loading and unloading apparatus as recited in the first aspect, in which the carriage is provided with a plurality of sensors for sensing an end surface of the sheet material, the sensors are disposed in the carriage in such a manner as to be adjacent to a plurality of clamps disposed in the carriage.

Accordingly, since at a time of gripping the sheet material by a plurality of clamps disposed in the carriage, the sheet material is gripped by the clamp when all of a plurality of sensors sense, the sheet material can be clamped at a right position without being inclined at a time of clamping the sheet material.

In accordance with a seventh aspect of the present invention, there is provided a sheet material loading and unloading method, in a sheet material loading and unloading apparatus comprising a frame having a lower frame and an upper frame attached to the lower frame in such a manner that the upper frame freely moves to a vertical direction, the frame is located in one side of a sheet material processing device, comprising the steps of: providing a vertically movable lifter within the frame; providing a truck going in and out over the lifter; mounting and piling a plurality of pallets which support the material on the truck; providing a plurality of escapable loading positioning members on the upper frame, the loading positioning members supporting a pallet disposed at a desired position by a vertical motion of the lifter among a plurality of piled pallets; providing a plurality of escapable material supporting members supporting a pallet disposed immediately above the pallet at the desired position in the upper frame; providing a plurality of clamps gripping the material to be processed in the sheet material processing device or the processed product which are mounted on the pallet supported by the loading positioning member, the clamps freely moving to a direction close to or apart from the sheet material processing device; ascending the upper frame by the lifter and descending the lifter after fixing at a predetermined operating height at a time of loading the material mounted on the pallet to the sheet material processing device; taking the truck supporting a plurality of pallets mounting the material within the frame; ascending the pallet by the lifter, stopping the ascent of the lifter and supporting the pallet by the material supporting member when the pallet immediately above the pallet disposed at the lowermost step is moved at a position of the material supporting member; a step of supporting the lowermost pallet by the loading positioning member and gripping the material mounted on the lowermost pallet by the cramp disposed in a carriage so as to load to the sheet material processing device; a step of gripping the product by the clamp disposed in the carriage so as to unload at a time of unloading the processed product from the processing device side; a step of receiving the product within an empty pallet disposed at the lowermost step on the lifter; and a step of successively loading and unloading a plurality of sheet materials in the same manner.

Accordingly, the pallet including the material and mounted on the truck is lifted up by the lifter, the ascent of the lifter is stopped when the pallet disposed at the second step from the lowermost is ascended to a position of the material supporting member, and the pallet is supported by the material supporting member. Then, the lifter is descended in a state of holding the lowermost pallet, and then the lowermost pallet is supported by the loading positioning member.

In this state, the material within the pallet is gripped by the clamp disposed in the carriage and is loaded to the processing device side. Then, the processed product is gripped by the clamp disposed in the carriage and taken within the empty pallet disposed at the lowermost step so as to be received. The materials in a plurality of pallets mounted on the truck are loaded to the processing device side and the products are received in the empty pallet by repeating the above operations.

Accordingly, since the material and the product can be received in the same pallet, a space necessary for the sheet material loading and unloading apparatus can be made a size nearly equal to a size of the sheet material, and an operability can be improved.

In accordance with a eighth aspect of the present invention, there is provided a pallet used for a sheet material loading and unloading apparatus comprising: a plurality of beam members for mounting a sheet material at one direction on a rectangular frame, the beam members disposed at a suitable interval; a taking-out member having a plurality of guide rods and a plurality of plates which make it easy to load the sheet material to one side of the frame, the taking-out member disposed in such a manner as to freely go in and out in a horizontal direction; and a positioning member and a support receiver disposed in both sides of the frame in the other direction perpendicular to the one direction of the frame.

Accordingly, since the taking-out member disposed in the pallet is taken out, the material is mounted on the plate so as to lay down the material in such a manner as to draw a circle and the material is pushed into the pallet, the material can be securely received within the pallet by a simple operation, so that an operability can be improved. Further, each of the pallets is positioned by the positioning member and the material supporting member or the loading positioning member of the sheet loading and unloading apparatus is inserted into the support receiver, so that the pallet can be supported.

BRIEF DESCRIPTION OF THE ACCOMPANYING DRAWINGS

The above and further objects and novel features of the present invention will more fully appear from the following detailed description when the same is read in conjunction with the accompanying drawings, in which.

DETAILED DESCRIPTION OF THE PREFERRED EMBODIMENTS

Figure 1:
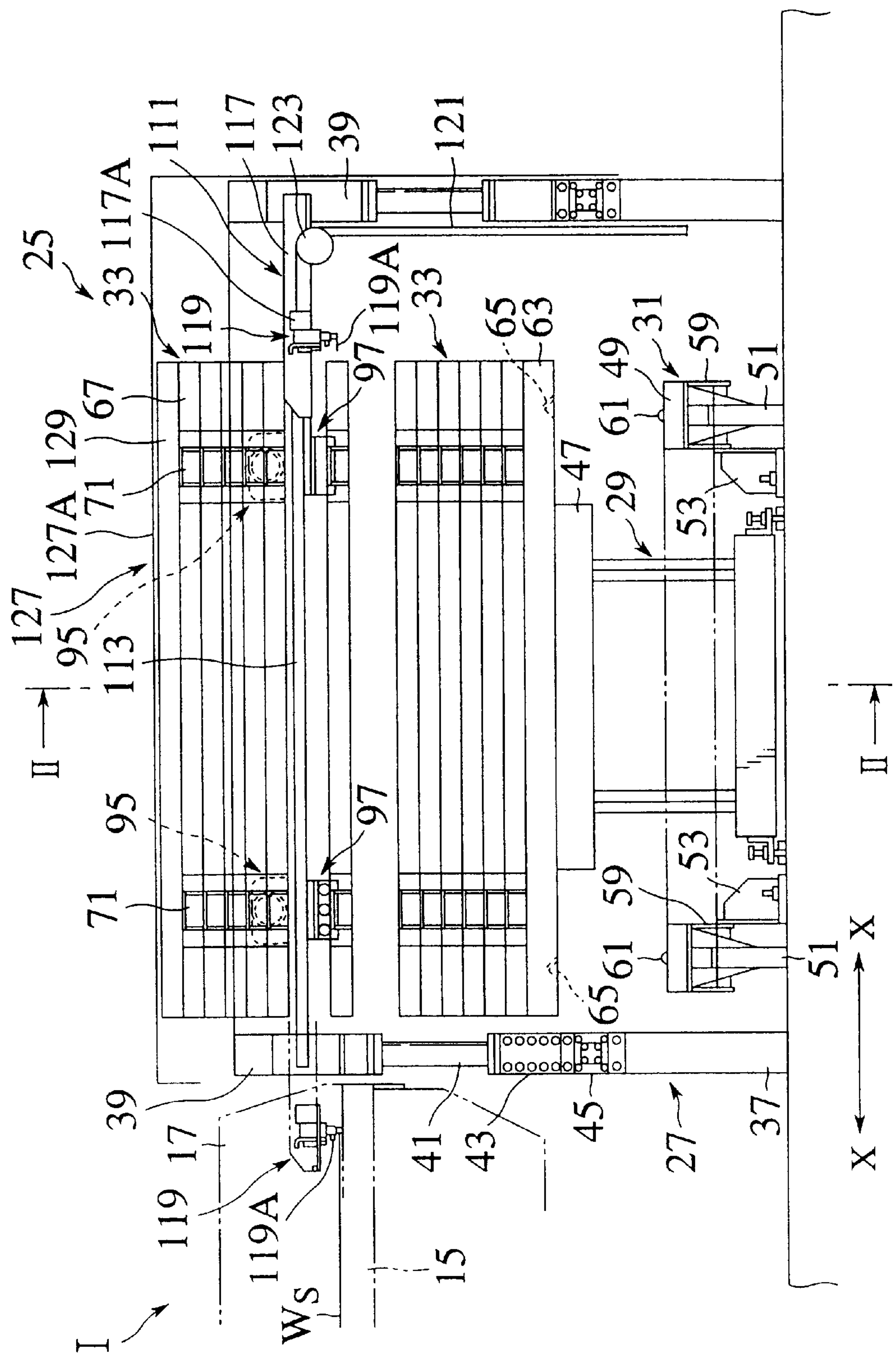
FIG. 1 is a side elevational view of a sheet material loading and unloading apparatus which shows a main portion in accordance with the present invention.

There will be detailed below the preferred embodiments of the present invention with reference to the accompanying drawings. Like members are designated by like reference characters.

In this case, in the embodiment, a turret punch press is employed as a sheet material processing device, however, the present invention can be applied, for example, to a laser beam machine and the like without limiting to this kind of device.

Figure 8:
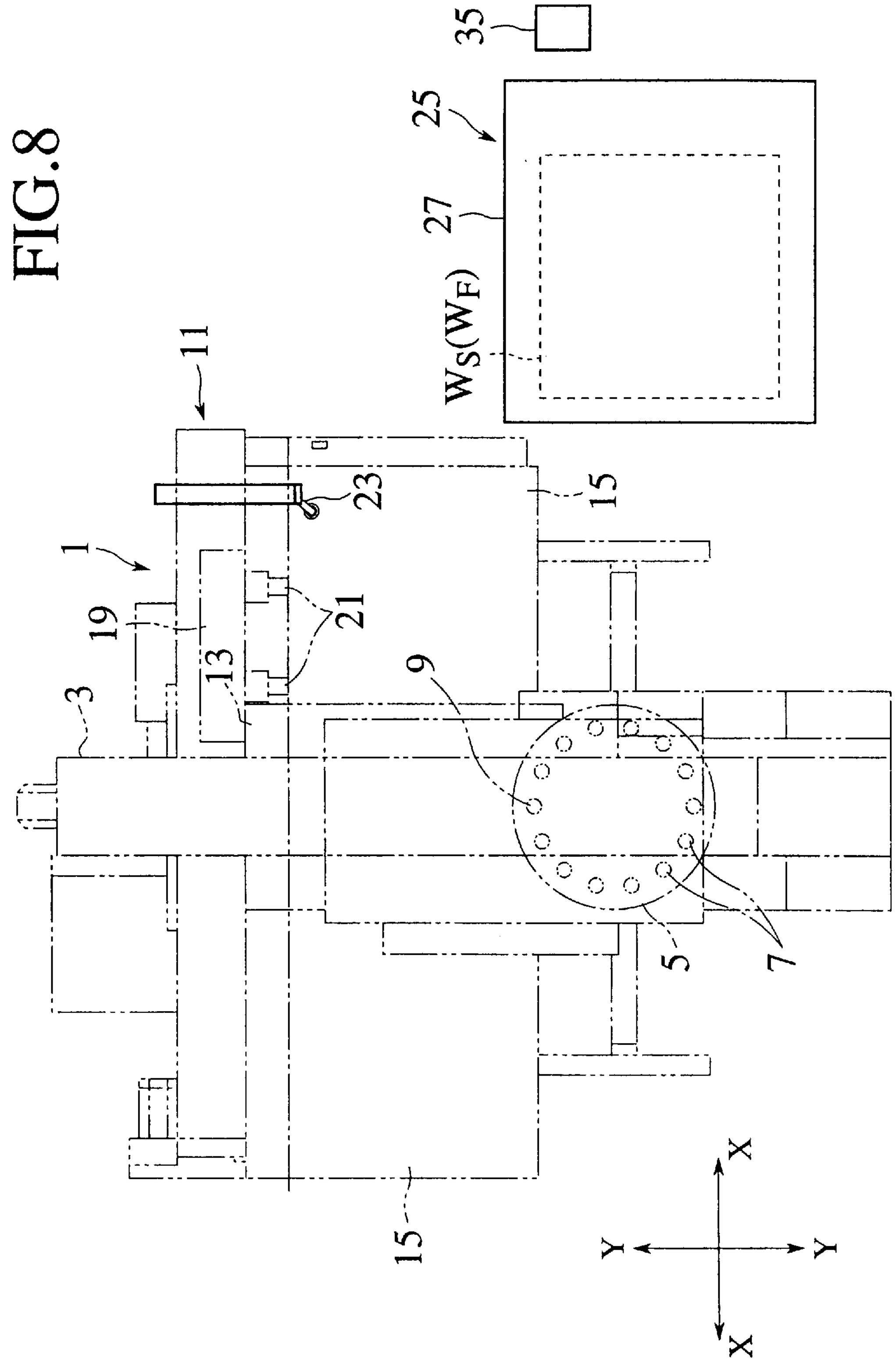
FIG. 8 is a plan view which shows an arrangement between a turret punch press and a sheet material loading and unloading apparatus in accordance with an embodiment of the present invention.

At first, a total arrangement and structure will be described. With referring to FIGS. 8, 9 and 10, a turret punch press 1 corresponding to a sheet material processing device is provided with an upper turret 5 within a gate-formed frame 3 and a lower turret (not shown) in a lower portion in such a manner as to oppose to the upper turret 5, and is mounted in such a manner as to freely rotate in a synchronous manner. Then, a multiplicity of upper metal molds 7 are attached to the upper turret 5 and a multiplicity of lower metal molds (not shown) are attached to the lower turret in such a manner as to oppose to the upper mold 7.

The upper metal mold 7 is struck by a vertical motion of a ram (not shown) provided in the upper portion of the gate-formed frame 3, and a punching process is performed to a work by cooperation of the upper metal mold 7 and the lower metal mold. In this case, reference numeral 9 denotes a position of a punching process.

A work positioning apparatus 11 for positioning the work is provided within the gate-formed frame 3. The work positioning apparatus 11 is provided with a movable table 15 which can move to a Y axis direction (a vertical direction in FIG. 8 and a direction perpendicular to a drawing sheet in FIGS. 9 and 10) in both sides of a fixed table 13 disposed near the upper turret 5. A carriage base 17 corresponding to a member constituting the work positioning apparatus 11 is integrally provided in the movable table 15 in such a manner as to stride over the fixed table 13.

A carriage 19 which can freely move to an X axis direction (a lateral direction in FIG. 8) is provided in the carriage base 17, and a plurality of work clamps 21 for clamping the work at a suitable interval in the X axis direction is provided in the carriage 19. In this case, reference numeral 23 denotes a pad for setting the origin.

In the structure mentioned above, the work clamped by the work clamp 21 provided in the carriage 19 is moved to the X axis and Y axis directions by moving the carriage base 17 to the Y axis direction and the carriage 19 to the X direction, respectively, so that a desired position of the work is positioned in the punching process position 9.

A sheet material loading and unloading apparatus 25 is provided at a forward movement position (the lower position in FIG. 8) of the movable table 15 in such a manner as to be adjacent to the movable table 15 provided in the turret punch press 1.

The sheet material loading and unloading apparatus 25 is constituted by a frame 27, a lifter 29 provided within the frame 27, a truck 31 freely going in and out in such a manner as to stride the lifter 29, and a pallet 33 mounting a material $W_S$ or a product $W_F$ supported on the truck 31. In this case, although an illustration is omitted, the frame 27 is surrounded by a vertically movable cover. In this case, reference numeral 35 denotes a control panel for operating each of elements in the sheet material loading and unloading apparatus 25.

Figure 9:
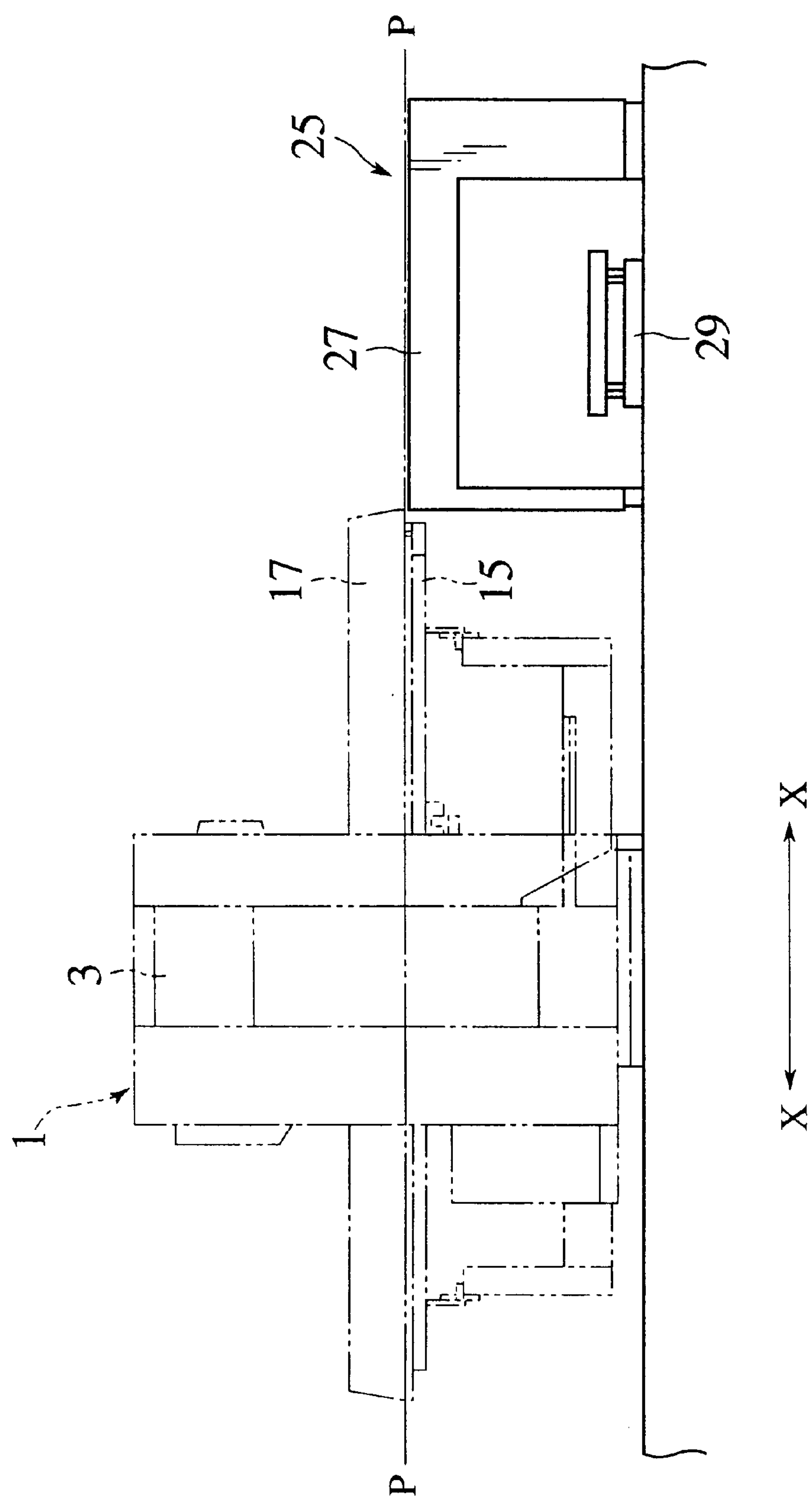
FIG. 9 is a side elevational view in FIG. 8.
Figure 10:
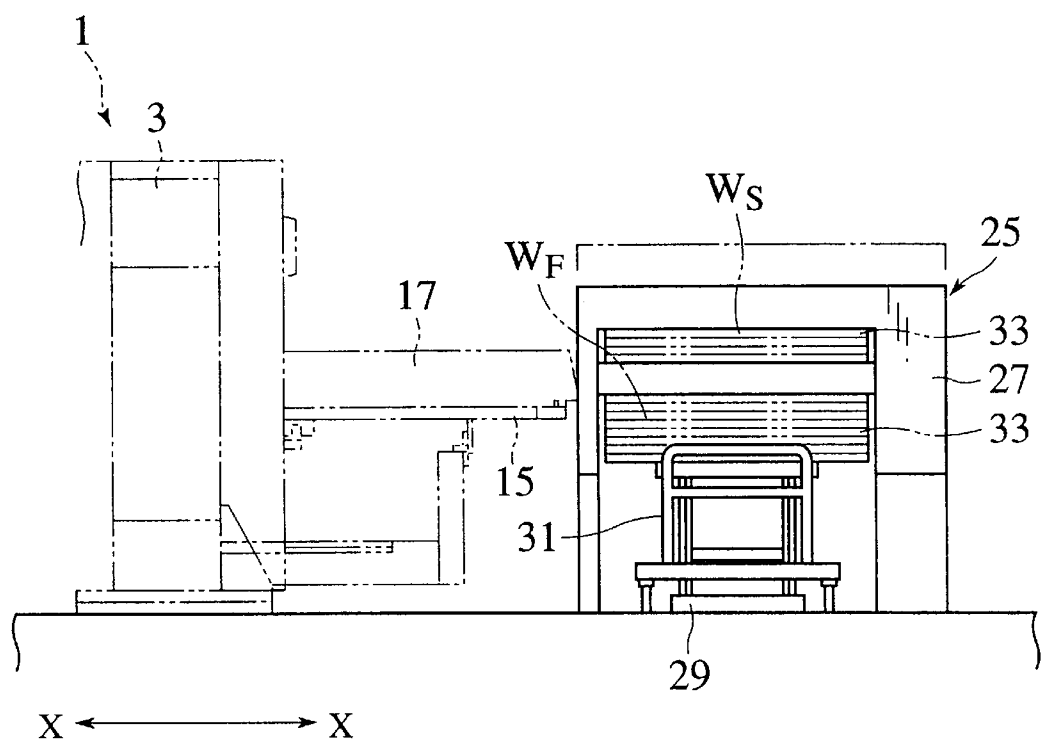
FIG. 10 is another side elevational view in FIG. 8.

In the structure mentioned above, since the sheet material loading and unloading apparatus 25 is provided in the forward position of the movable table 15 in an adjacent manner, the apparatus does not obstruct at a time of manually using the turret punch press 1, and the sheet material loading and unloading apparatus 25 can be made compact by receiving the material $W_S$ and the product $W_F$ in the same pallet 33, so that a cost can be reduced. Further, at a time of an off-line, since the sheet material loading and unloading apparatus 25 is received at a lower position than a pass line P—P of the turret punch press 1, as shown in FIG. 9, an upper surface of the cover surrounding the frame 27 can be used as a working table, so that an operability can be improved.

Next, the sheet material loading and unloading apparatus 25 corresponding to a main portion of the embodiment in accordance with the present invention will be described in detail.

Figure 2:
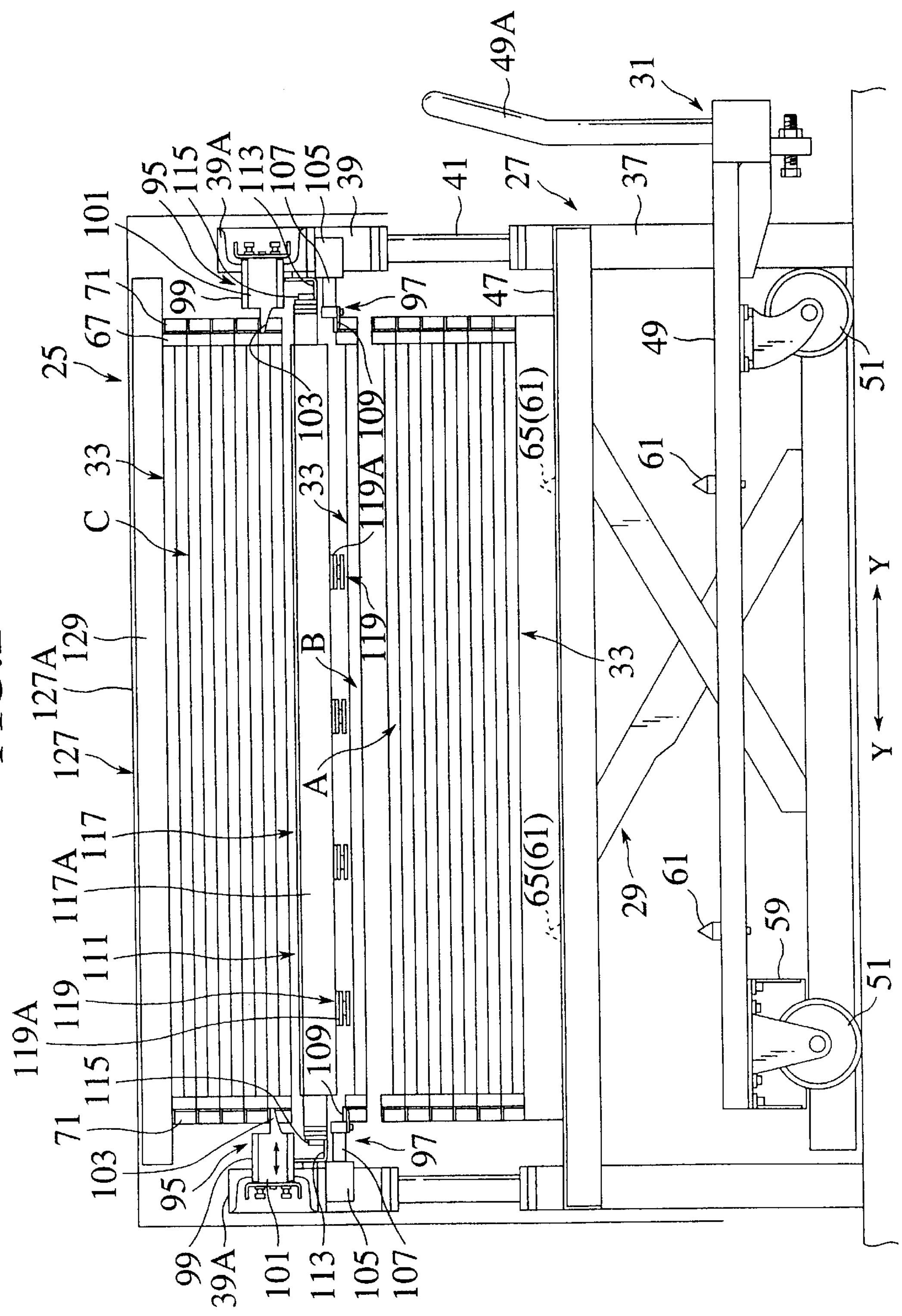
FIG. 2 is an enlarged cross sectional view along a line II—II in FIG. 1.

With referring to FIGS. 1 and 2, the rectangular frame 27 is constituted by a fixed lower frame 37 and an upper frame 39 attached on the lower frame 37 in such a manner as to freely move to a vertical direction. More particularly, a rod 41 provided in the lower portion of the upper frame 39 is inserted, for example, into a linear bush 43 provided in the lower frame 37 so as to be freely moved to a vertical direction, and a positioning in a vertical direction of the upper frame 39 is performed by stopping a descent of the rod 41 by means of a piston rod of a hydraulic cylinder 45 provided in the lower frame 37 so as to fix the upper frame 39.

Figure 3:
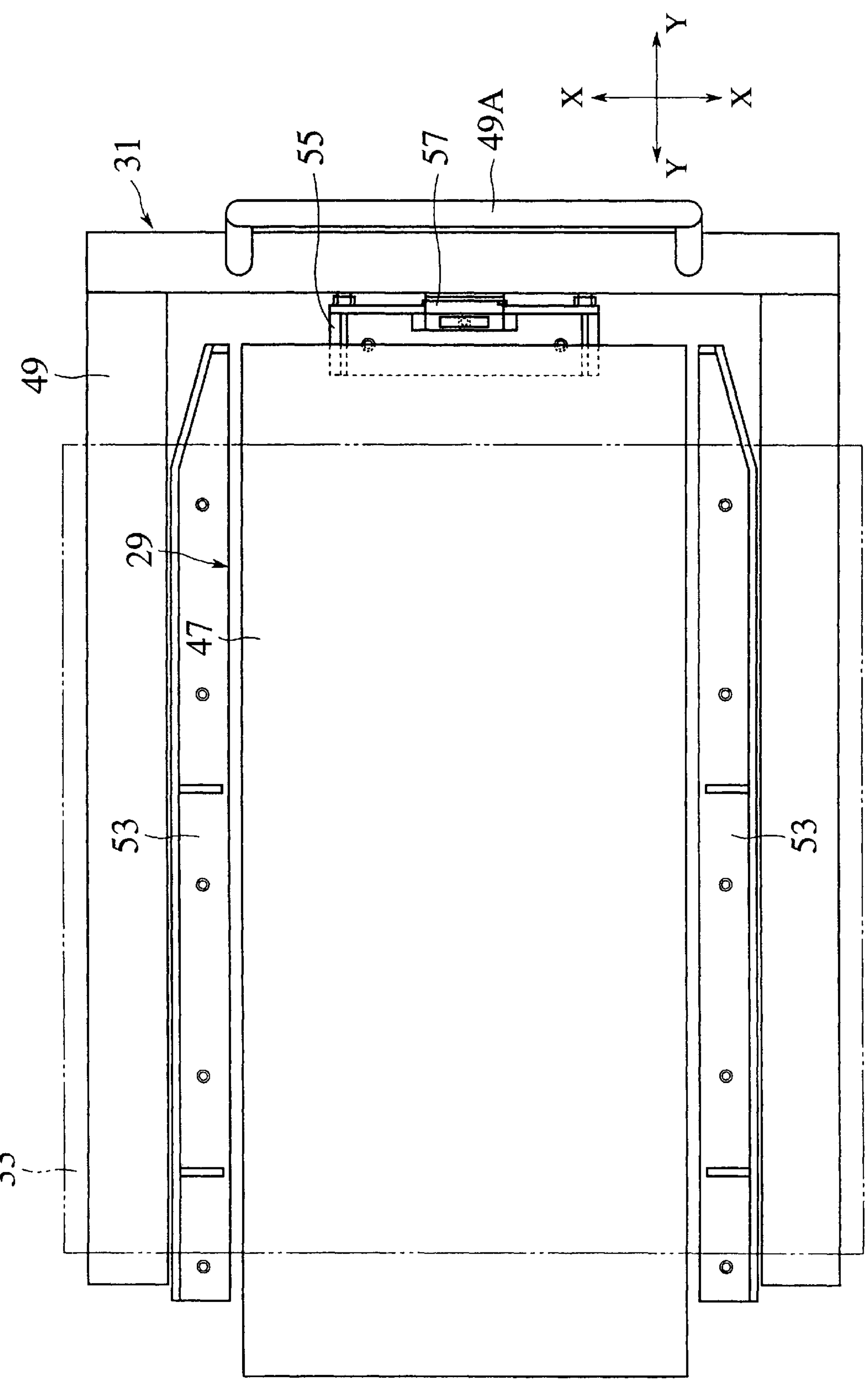
FIG. 3 is a plan view which schematically shows a truck in FIG. 1.

The lifter 29 is provided within the frame 27, the lifter 29 has an already known structure, and is provided with a supporting plate 47 which is freely moved to a vertical direction by, for example, a hydraulic cylinder and the like. Then, the truck 31 can go in and out with striding over the lifter 29, and with also referring to FIG. 3, the truck 31 is provided with a plurality of vehicle wheels 51 in the lower portion of a truck main body 49, and guided by a guide rail 53 provided in both sides of an X axis direction of the lifter 29 so that the truck can freely go in and out with striding over the lifter 29.

Further, a stopper member 55 is provided in a front end (in a right side in FIG. 3) of the lifter 29, and a truck locking member 57 for fixing the truck 31 at a time of being brought into contact with the stopper member 55 is provided in the truck 31. Still further, a guide member 59 is suspended in such a manner as to be adjacent to the vehicle wheel 51 in the front end (the left side in FIG. 2) of the truck main body 49, so that the truck 31 can be inserted into a predetermined position along the guide rail 53. Furthermore, a plurality of locking pins 61 are provided in the upper surface of the truck main body 49 in a projecting manner, and the locking pin 61 is inserted into an engaging hole 65 provided in a base plate 63 supporting the pallet mentioned below, so that the pallet 33 can be positioned. In this case, reference numeral 49A denotes a manual handle.

Figure 4:
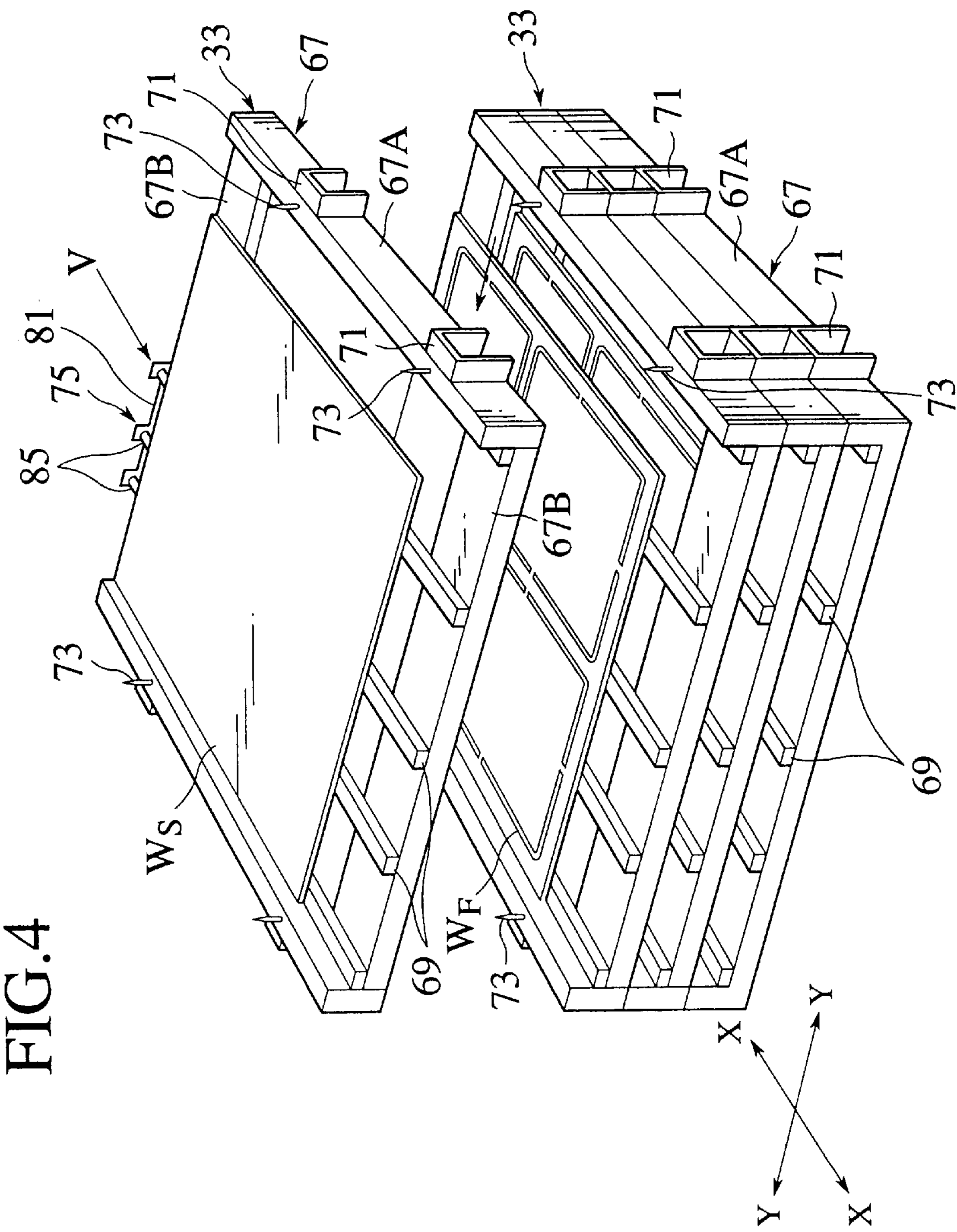
FIG. 4 is a perspective view which schematically shows a pallet.

With also referring to FIG. 4, the pallet 33 is structured such that a plurality of beam members 69 for mounting the sheet material are provided on the rectangular frame 67. Then, a plurality of U-shaped shot pin receivers 71 each having an opening to which a material supporting pin corresponding to the material supporting member and a loading positioning pin corresponding to the loading positioning member are inserted, are disposed on an outer surface of a side plate 67A in both sides of a Y axis direction of the frame 67, and a supporting plate 67B for supporting the beam member 69 is provided in both ends of an X axis direction of the frame 67. The details of the material supporting pin and the loading positioning pin will be described below.

A plurality of positioning pins 73 corresponding to the positioning member are provided on the upper surface of the side plate 67A in a projecting manner, and an engaging hole (not shown) engaging with this positioning pin 73 is provided in the lower surface of the side plate 67A.

In accordance with the structure mentioned above, since the pallet 33 is positioned by the positioning pin 73 with each other, the position is not shifted even when a plurality of steps are piled.

A taking-out member 75 is provided in a sheet material loading side (in an upper side in FIG. 4) among the supporting plates 67B provided in the frame 67. More particularly, as shown in FIG. 5, a guide block 77 is provided on the upper surface of the supporting plate 67B constituting the frame 67, the guide block 77 is mounted to the lower portion of the beam member 69 from the lower side, and the guide rod 79 extending to a lateral direction in FIG. 5 is inserted into the guide block 77.

Figure 5:
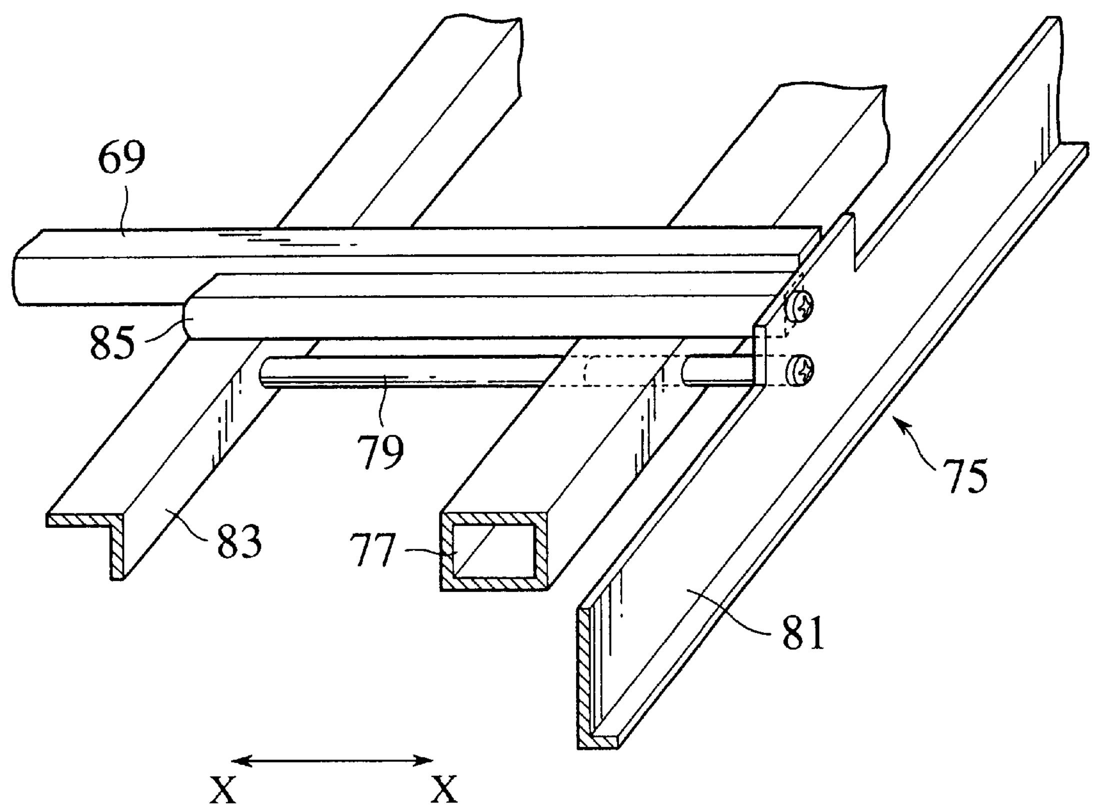
FIG. 5 is an enlarged perspective view of a portion shown by an arrow V in FIG. 4.

A taking-out plate 81 is mounted to a right end in FIG. 5 of the guide rod 79, and a bracket 83 is mounted to a left end of the guide rod 79. Further, the taking-out plate 81 and the bracket 83 are mounted in both ends of the plate 85.

Figure 6A:
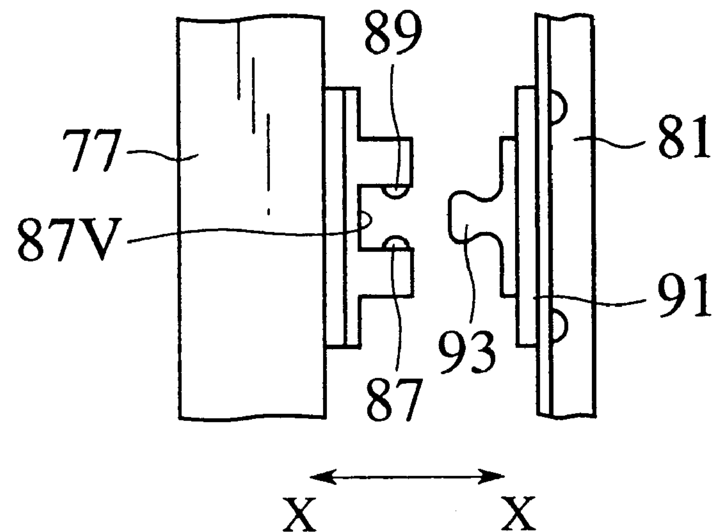
FIGS. 6A and 6B are schematic views of a taking-out member.

A supporting block 87 is integrally provided in the guide block 77, as shown in FIG. 6A, and a ball 89 capable of freely going in and out is provided in upper and lower portions in FIG. 6A of a groove formed in the supporting block 87. On the contrary, a supporting block 91 is integrally provided in the taking-out plate 81, and an engaging member 93 engaging with and removing from the ball 89 is provided in the supporting block 91. In this case, in place of the ball 89, a leaf spring may be employed.

Figure 6B:
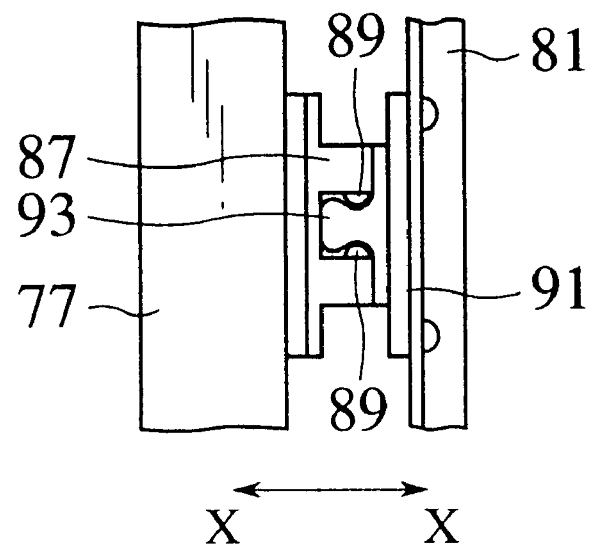
Figure 7:
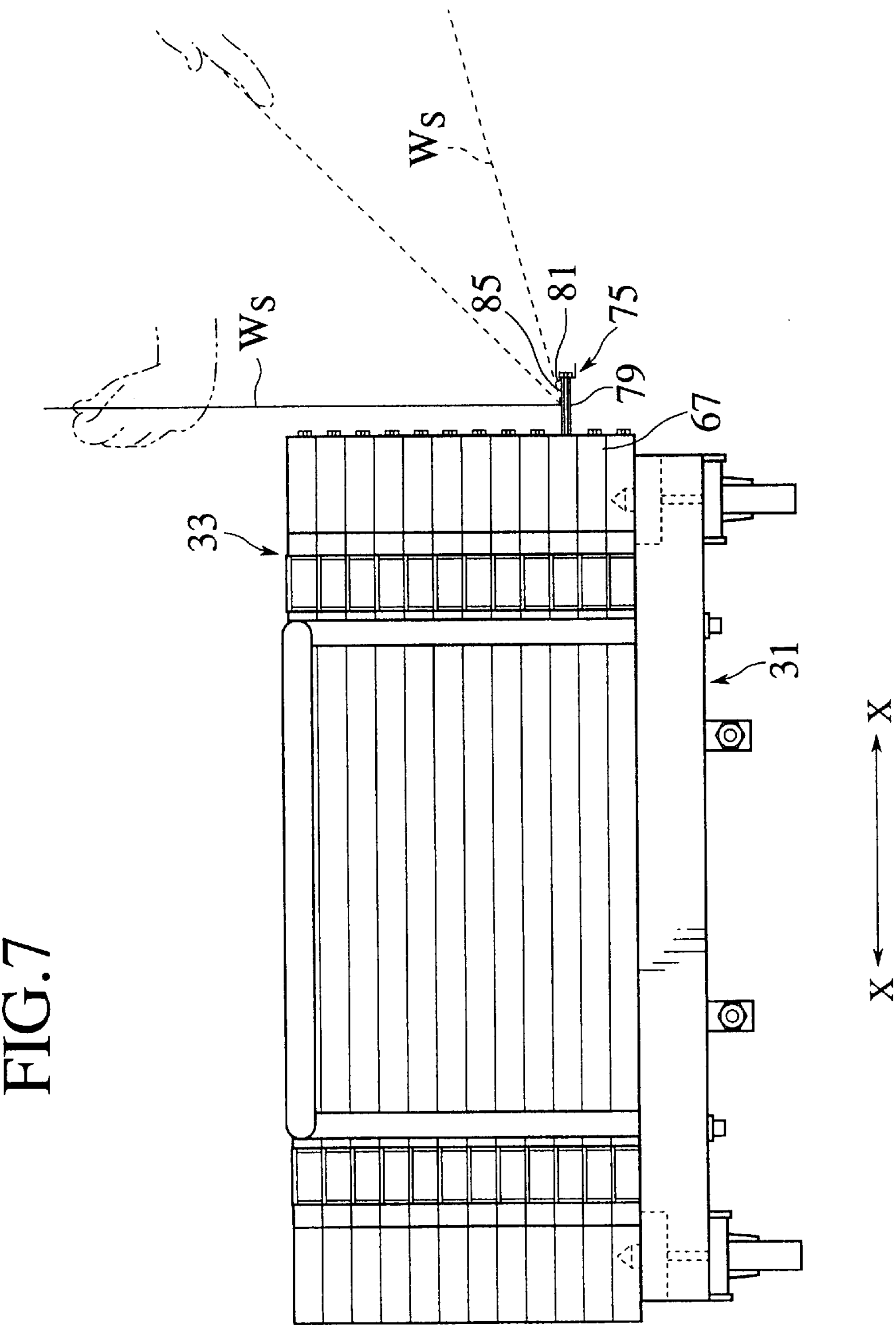
FIG. 7 is a schematic view of an operation.

In accordance with the structure mentioned above, with also referring to FIG. 7, as an operation, at a time of mounting the material $W_S$ to the pallet 33, at first, the material $W_S$ is taken out from the pallet 33 with holding the taking-out plate 81 provided in the taking-out member 75. In this state, with holding the material $W_S$, one end of the material $W_S$ is mounted on the plate 85 as shown in FIG. 7 and is laid down in such a manner as to draw a circle so that the material $W_S$ is pressed into the pallet 33. The material $W_S$ is received within the pallet 33. Thereafter, when the taking-out member 75 is pressed to the state shown in FIG. 6B from the state shown in FIG. 6A, the engaging member 93 is caught by the ball 87 so that the taking-out member 75 is positioned. Accordingly, the taking-out member 75 is prevented from projecting during the movement of the pallet 33.

Accordingly, an operation for receiving the material $W_S$ in the pallet 33 is made simple, so that an operability can be improved.

With again referring to FIGS. 1 and 2, FIGS. 1 and 2 show a state at which six sheets are already processed and a seventh sheet is now processed, and as shown in FIG. 2, reference symbol A denotes the pallet 33 receiving the product $W_F$, reference symbol B denotes the pallet 33 to be processed, and reference symbol C denotes the pallet 33 receiving the material $W_S$.

At first, in a plurality of (in the embodiment, twelve) pallets 33 mounted on the lifter 29, the pallet 33 immediately above the lowermost pallet 33 (the second stage from the lowermost) is supported by the material supporting pin 95 due to the ascent of the lifter 29, and the lowermost pallet 33 is supported by the loading positioning pin 97. Then, the material $W_S$ received within the lowermost pallet 33 is unloaded to the turret punch press 1, and the processed product $W_F$ is again received within the pallet. This operation is repeated, so that the state shown in FIG. 2 is obtained.

The material supporting pin 95 is provided at a plurality of portions in correspondence to a horizontal beam 39A extending to an X axis direction of the upper frame 39 constituting the frame 27. More particularly, a pin portion 101 is provided within a cylindrical body 99 projecting to an inward direction from the horizontal beam 39A by a cylinder or the like (not shown) in a escapable manner, and a pallet supporting portion 103 engaging with the shot pin receiver 71 provided in the pallet 33 is formed in the front end of the pin portion 101.

In accordance with the structure mentioned above, the pin portion 101 is projected by the cylinder or the like, the shot pin receiver 71 provided in the pallet 33 is supported by the pallet supporting portion 103 formed in the front end of the pin portion 101, so that the pallet portion mounting the material in the C portion can be supported.

The loading positioning pin 97 is provided at a plurality of portions in correspondence to the lower surface of the horizontal beam 39A provided in the upper frame 39. More particularly, a hydraulic cylinder 105 is provided in the lower surface of the horizontal beam 39A, a pin portion 107 moving forward and rearward by means of the cylinder 105 is provided, and a pallet supporting portion 109 engaging with the shot pin receiver 71 provided in the pallet 33 is integrally provided in the front end of the pin portion 107.

In accordance with the structure mentioned above, the pallet 33 in the B portion can be supported by projecting the pin portion 107 by means of the cylinder 105 and supporting the shot pin receiver 71 provided in the pallet 33 by means of the pallet supporting portion 109 provided in the front end of the pin portion 107.

A loading apparatus 111 for loading the material $W_S$ received in the pallet 33 supported by the loading positioning pin 97 or the processed product $W_F$ into the pallet 33 is provided within the frame 27. More particularly, the loading apparatus 111 is provided in a middle portion between the material supporting pin 95 and the loading positioning pin 97, and a guide rail 113 is provided in an internal surface end of the horizontal beam 39A provided in the upper frame 39 in such a manner as to extend to an X axis direction. A carriage 117 is provided in such a manner as to freely move to an X axis direction on the guide rail 113 through a roller 115.

A stay 117A connected in a Y axis direction is integrally provided in the carriage 117, and a clamp 119 having a plurality of clamp hooks 119A is disposed in the stay 117A. In this case, the structure of the clamp 119 is already known, for example, which corresponds to a structure for gripping the sheet material by moving the upper and lower clamp hooks 119A by means of a cylinder or the like.

A drive member for the carriage 117 is structured such that a drive pulley 123 meshed with a chain (a snake chain or the like) 121 having an end connected to the stay 117A is connected to a drive motor (not shown) provided in the upper frame 39.

In accordance with the structure mentioned above, when the drive motor is driven and the drive pulley 123 is rotated, the carriage 117 moves to an X axis direction through the chain 121. The material $W_S$ gripped by the clamp 119 provided in the carriage 117 can be loaded to the turret punch press 1 due to the movement of the carriage 117, or the processed product $W_F$ can be gripped and received within the pallet 33.

Figure 11:
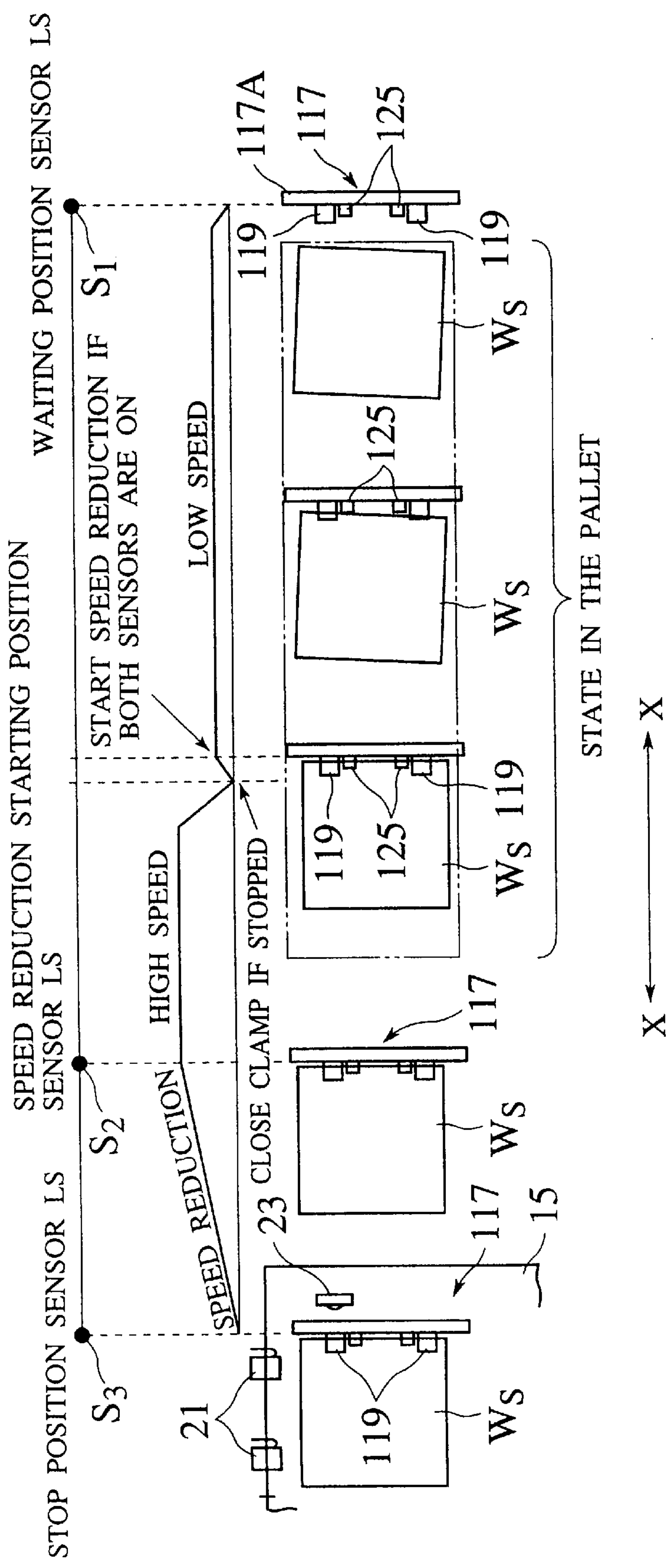
FIG. 11 is a schematic view which explains an operation at a time of loading a sheet material to a sheet material processing device.

A plurality of clamps 119 are provided in the stay 117A provided in the carriage 117, and as shown in FIG. 11, a plurality of (in this embodiment, two) sensors 125 are provided in such a manner as to be adjacent to the clamp 119. In this case, the sensor 125 may be a limit switch or a proximity switch.

In accordance with the structure mentioned above, as shown in FIG. 11, when the material $W_S$ received within the pallet 33 is received in an inclined state, a motion of the carriage 117 and a grip timing of the clamp 119 are set such that the carriage 117 is disposed at a waiting position by a waiting position sensor S1, and the carriage 117 moves at a low speed driven by the drive motor from the position. At first, the sensor 125 disposed in one side detects the material $W_S$, and after further forward movement, the sensors 125 disposed in both sides detect the material $W_S$. When both the sensors 125 are turned to be an ON state, the material starts reducing the speed, and at a time of being stopped, the clamp 119 is closed so as to grip the material $W_S$.

In this state, the material $W_S$ is gripped by the clamp 119 in a perpendicular state and moved at a high speed, and the carriage 117 is moved with reducing the speed by a speed reduction starting position sensor S2 provided in a predetermined position. Then, the carriage 117 stops at a position of a stop position sensor S3, the clamp 119 gripping the material $W_S$ is turned to be opened, and the carriage 117 waits in the near position so as to wait an unloading of the processed product $W_F$.

With again referring to FIGS. 1 and 2, a cover 127 surrounding the frame 27 is provided in such a manner as to vertically move, and a supporting plate 129 is integrally provided in the lower surface of a top plate portion 127A of the cover 127.

In accordance with the structure mentioned above, the cover 127 is lifted up by the lifter 29 through the upper frame 39, is brought into contact with the lowermost pallet 33 among the piled pallets 33 on the truck 31, and then lifted up by the lifter 29 through the pallet 33.

Figure 12:
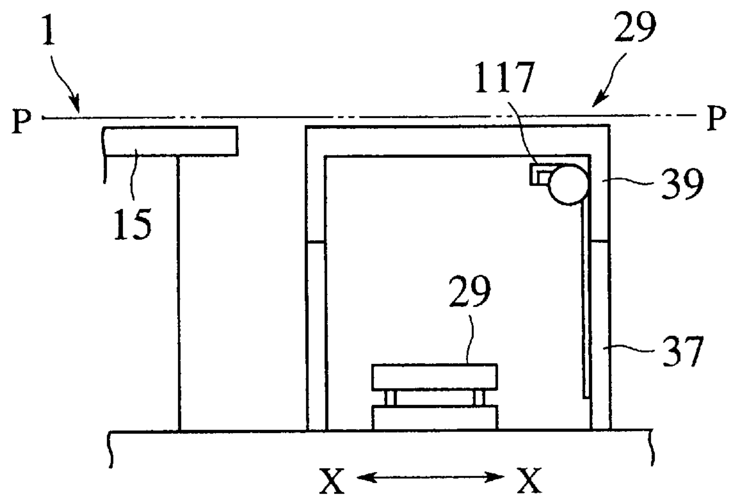
FIG. 12 is a schematic view of an operation.

In accordance with the structure as mentioned above, the operation will be described below with reference to FIGS. 12 to 25. At first, FIG. 12 shows a state in which no operation is performed. In this state, the upper frame 39 constituting the frame 27 is positioned at the lowest limit, and the upper portion is positioned below the pass line P—P of the turret punch press 1. In this case, the carriage 117 is disposed at a waiting position and the lifter 29 is disposed at the lowest limit.

Figure 13:
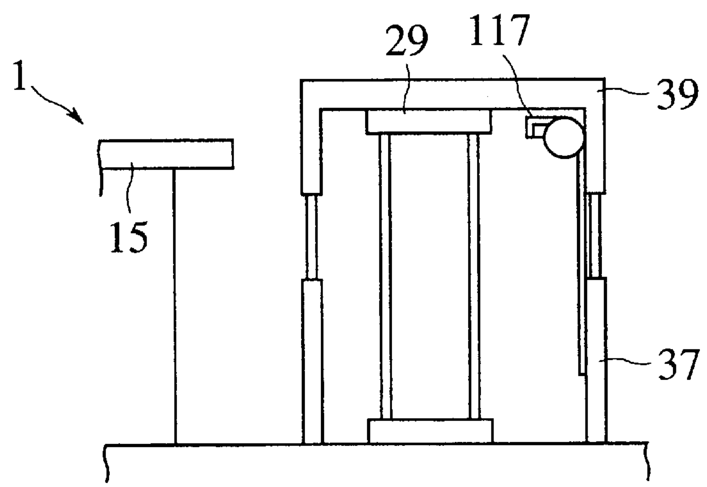
FIG. 13 is a schematic view of an operation.

Next, as shown in FIG. 13, the lifter 29 is lifted up and the upper frame 39 is lifted up to a predetermined working height.

Figure 14:
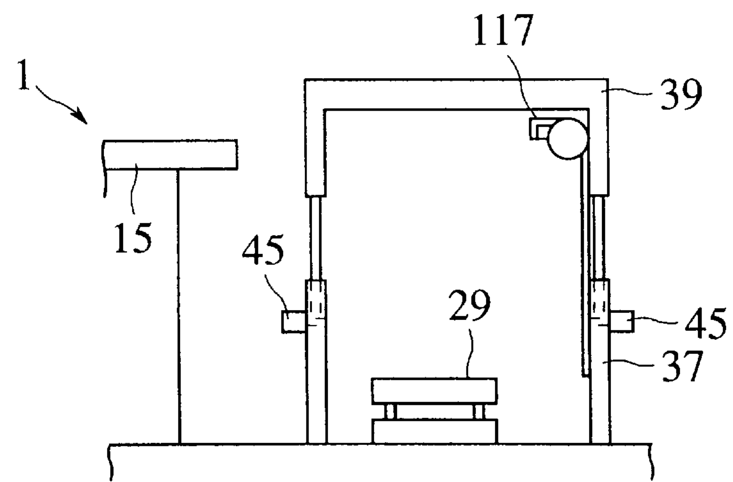
FIG. 14 is a schematic view of an operation.

Then, as shown in FIG. 14, the upper frame 39 is fixed by operating the cylinder 45 provided in the lower frame 37, so that the frame 27 is totally fixed to the working height. Thereafter, the lifter 29 is descended to the descending end, so that a preparation for receiving the truck 31 is performed.

Figure 15:
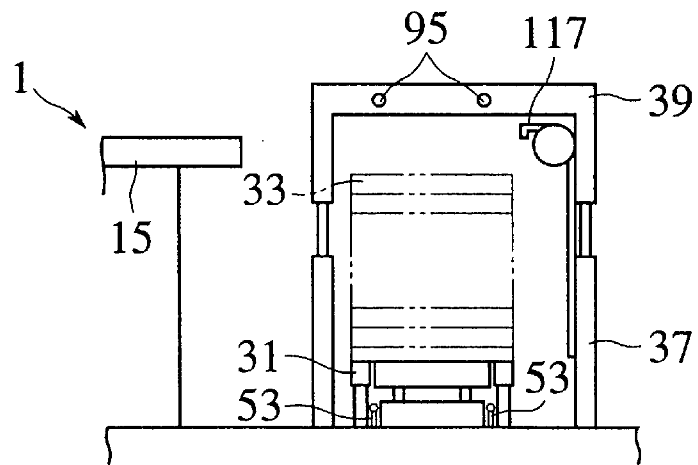
FIG. 15 is a schematic view of an operation.

The truck 31 on which the material $W_S$ is set in the other place is inserted along a guide rail 53 fixed to the floor and in such a manner as to stride over the lifter 29, as shown in FIG. 15, so that the truck 31 is fixed by a truck locking member 57 (not shown).

Figure 16:
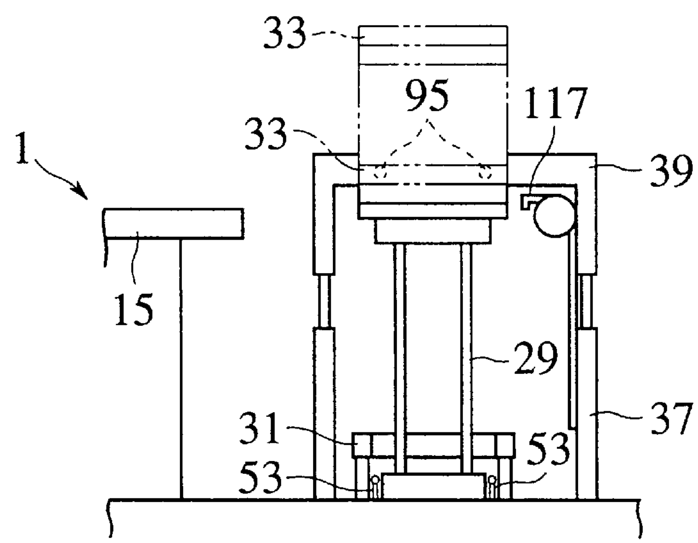
FIG. 16 is a schematic view of an operation where all pallets are elevated by a lifter.

In this state, as shown in FIG. 16, the lifter 29 is ascended so as to lift up whole the pallet 33 in which the material $W_S$ is received. Then, when the pallet 33 disposed at the second step from the lowermost is disposed at a portion corresponding to the material supporting pin 95, the lifter 29 is stopped ascending. Then, the material supporting pin 95 is projected so as to support the pallet 33 in which the material $W_S$ above the second step from the lowermost is received.

Figure 17:
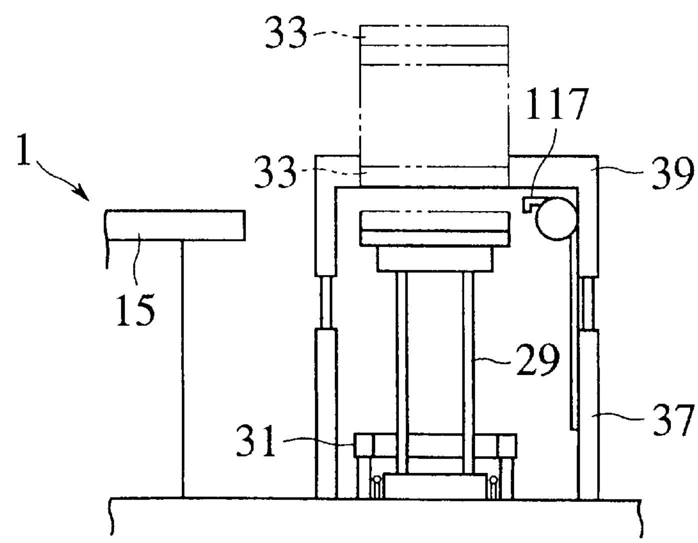
FIG. 17 is a schematic view of an operation.

Then, as shown in FIG. 17, the lifter 29 descends with holding the pallet 33 at the lowermost step, and when the lowermost pallet 33 is disposed at a place corresponding to the loading positioning pin 97 (not shown), the descent is stopped. The loading positioning pin 97 projects so as to support the lowermost pallet 33, and further the lifter 29 a little descends, so that the pallet 33 is fixed to the loading pass line.

Figure 18:
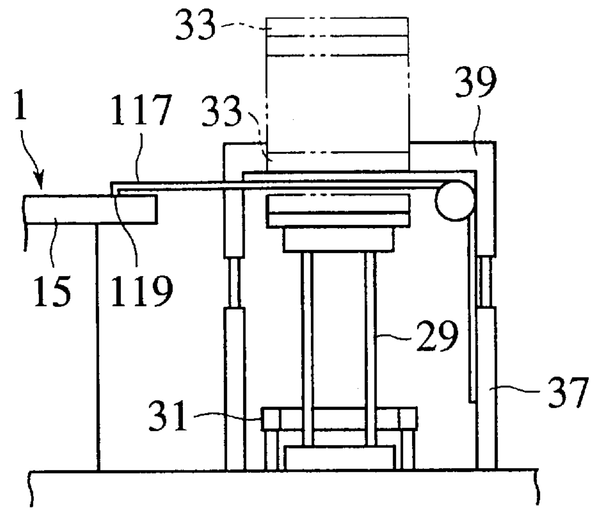
FIG. 18 is a schematic view of an operation.

In this state, as shown in FIG. 18, the carriage 117 provided with the clamp 119 enters into the pallet 33 with being clamped by the clamp 119. When all of the sensors 125 (not shown) mounted to the carriage 117 are turned to be an ON state, the material $W_S$ is loaded to the turret punch press 1 with being gripped.

Figure 19:
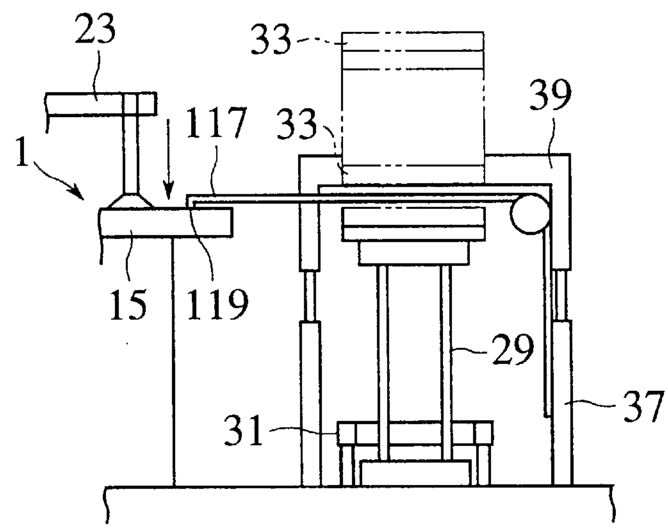
FIG. 19 is a schematic view of an operation.

Then, as shown in FIG. 19, when the material $W_S$ enters within an indicated range of the turret punch press 1, the pad for setting the origin descends and adsorbs the material $W_S$.

Figure 20:
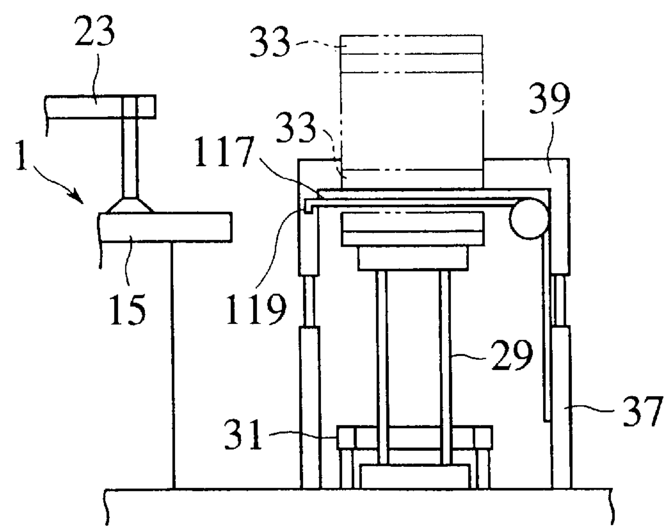
FIG. 20 is a schematic view of an operation where a clamp member unlamps a sheet material and a carriage is retracted.

When the origin setting pad 23 adsorbs the material $W_S$, as shown in FIG. 20, the clamp 119 provided in the carriage 117 is opened so as to remove the material $W_S$, and the carriage 117 is evacuated and waits in the near portion.

Figure 21:
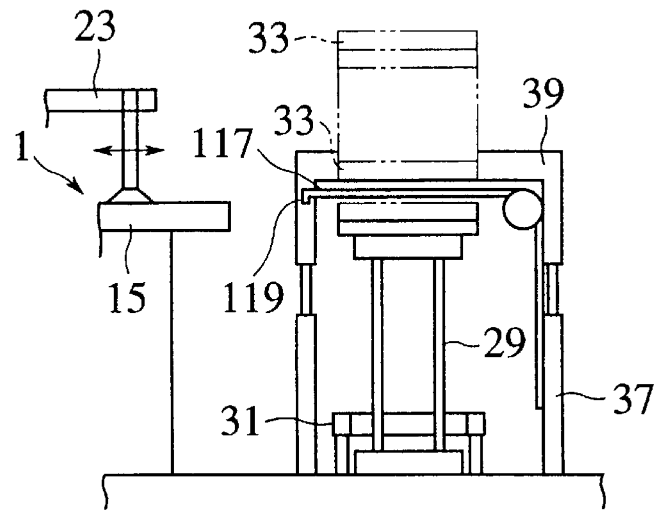
FIG. 21 is a schematic view of an operation.

Then, as shown in FIG. 21, the origin setting pad 23 draws the material $W_S$ to the origin, the work clamp 21 (not shown) of the work positioning apparatus 11 provided in the turret punch press 1 end grips the material $W_S$, the absorption by the origin setting pad 23 is removed, and the origin setting pad 23 is ascended.

Thereafter, the desired processing position for the material $W_S$ is positioned to a punching process position 9 by an operation of the work positioning apparatus 11, and the process of the turret punch press 1 is started, so that the process of the product $W_F$ is finished.

Figure 22:
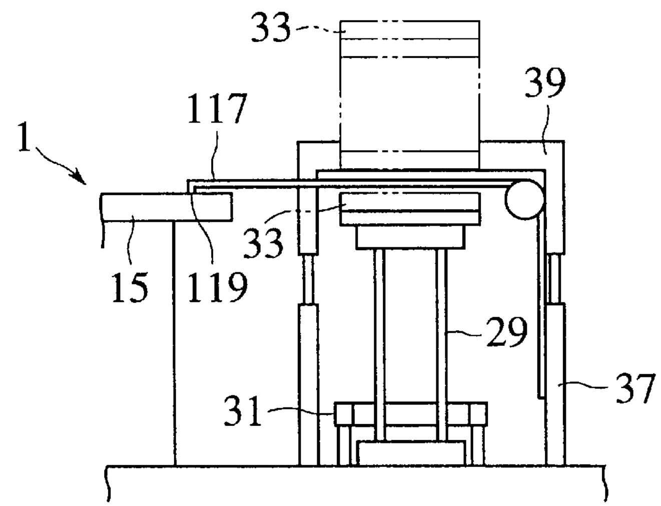
FIG. 22 is a schematic view of an operation.

Next, in order to take out the processed product $W_F$, as shown in FIG. 22, the waiting carriage 117 is going to take the product $W_F$ in an open state. When all the sensors 125 provided in the carriage 117 are turned to be an ON state, the clamp 119 is closed and grips the product $W_F$. Thereafter, the work clamp 21 provided in the work positioning apparatus 11 close to the turret punch press 1 is turned to be open, and the product $W_F$ is in the carriage 117 side. Accordingly, the carriage 117 is offset to a side opposite to the work clamp 21 close to the turret punch press 1, thereby removing the product $W_F$ from the work clamp 21.

Figure 23:
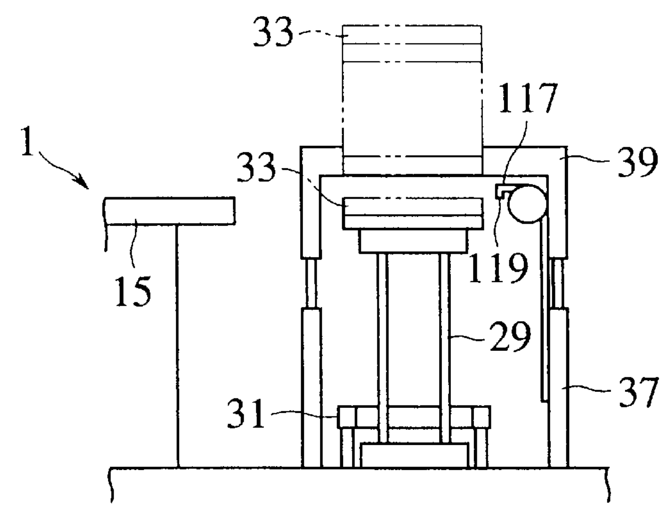
FIG. 23 is a schematic view of an operation where the carriage is retracted thereby the sheet material is located in the parret.

In this state, as shown in FIG. 23, the carriage 117 goes backward so as to take the product $W_F$ within the pallet 33 and receive it. When the carriage 117 passes through the sensor (not shown) mounted immediately in front of the rearmost portion of the pallet 33, the clamp 119 is turned to be open so as to put the product $W_F$ within the pallet 33, and further the carriage 117 goes backward, and then waits at a portion not interfering with the pallet 33.

Figure 24:
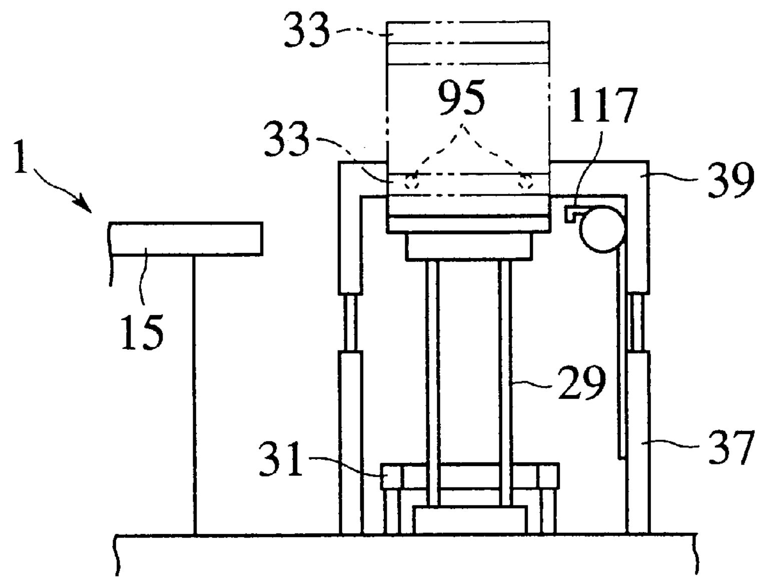
FIG. 24 is a schematic view of an operation.

Then, as shown in FIG. 24, the lifter 29 ascends, and with slightly floating the pallet 33 in which the current product $W_F$ is entered, the loading positioning pin 97 is drawn, so that the pallet 33 in which the product $W_F$ is entered is mounted on the lifter 29. Further, the lifter 29 ascends so as to slightly float the material pallet 33 portion supported by the material supporting pin 95, so that all the pullets 33 are mounted on the lifter 29 by drawing the material supporting pin 95.

Figure 25:
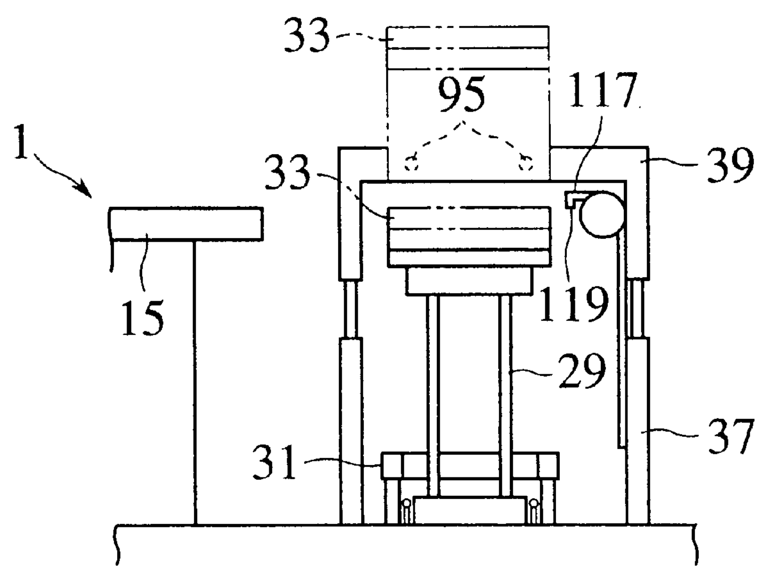
FIG. 25 is a schematic view of an operation.

Next, as shown in FIG. 25, the lifter 29 starts descending, and when the pallet 33 disposed at the third step from the lowermost is arranged at a place of the material supporting pin 95, the descending is stopped. Then, the material supporting pin 95 is projected so as to support the pallets 33 disposed above the third step from the lowermost. The lifter 29 descends in a state of supporting the lowermost pallet 33 and the pallet 33 disposed at the second step from the lowermost. When the pallet 33 disposed at the second step from the lowermost is arranged at a place of the loading positioning pin 97, the lifter 29 stops descending and the loading positioning pin 97 is projected so as to support the pallet 33 disposed at the second step from the lowermost. Further, the lifter 29 descends, and the pallet 33 is fixed to the loading pass line.

Then, by returning to the operation shown in FIG. 18 and repeating the operations between FIG. 18 and FIG. 25, the materials $W_S$ mounted on all the pullets 33 are loaded to the turret punch press 1, the processed products $W_F$ are received within the same pallet 33, when all the products $W_F$ are received within the pallet 33, the truck 31 is pulled out, and another truck 31 supporting the pullet 33 in which the material $W_S$ is mounted is assembled, thereafter repeating the operation again.

Accordingly, since the material $W_S$ and the product $W_F$ are received in the same pallet 33, a space of the total equipment can be made small and an operability can be improved, so that a structure can be made compact and a cost can be significantly reduced in comparison with the conventional apparatus. Further, the total apparatus is surrounded by the cover 127, so that it can be used as a table at the descending end without an operating time and an operability can be improved.

In this case, the present invention is not limited to the embodiment mentioned above, and can be realized in the other aspects by suitably modifying the structure. For example, in the embodiment, the sheet material loading and unloading apparatus 25 is provided near the forward moving direction of the movable table 15 provided in the turret punch press 1, however, the sheet material loading and unloading apparatus 25 may be provided at the rearmost position of the movable table 15, that is, near the waiting position of the carriage base 17.

While preferred embodiments of the present invention have been described using specific terms, such description is for illustrative purposes, and it is to be understood that changes and variations may be made without departing from the spirit or scope of the following claims.

What is claimed is:

1. A sheet material loading and unloading apparatus comprising:

a frame having a lower frame and an upper frame attached to the lower frame in such a manner as to freely move to a vertical direction, the frame being to be located in one side of a sheet material processing device;

a vertically movable lifter disposed within the frame;

a truck going in and out over the lifter;

a plurality of pallets supporting a material to be processed in the sheet material processing device or a processed product having been processed which are vertically moved by the lifter, the pallets being disposed on the truck;

a plurality of escapable loading positioning members being disposed in the upper frame, the loading positioning member separating and supporting a pallet disposed at a desired position among a plurality of the piled pallets by the lifter;

a plurality of escapable material supporting members being disposed in the upper frame, the material supporting member separating and supporting a pallet disposed immediately above the pallet at the desired position by the lifter; and a carriage being disposed within the frame, the carriage having a plurality of clamps gripping the material or the processed product mounted on the pallet supported by the loading positioning member, the clamps freely moving in a direction close to or apart from the sheet material processing device.

2. The sheet material loading and unloading apparatus according to claim 1, wherein the frame is disposed near a forward movement end of a movable table provided in the sheet material processing device; and the movable table supports the sheet material and freely moves to forward and rearward directions.

3. The sheet material loading and unloading apparatus according to claim 1, further comprising:

a pin portion having a pallet supporting portion for supporting the pallet, the pin portion being disposed in a front end of the material supporting member and the loading positioning member, wherein the pin portion is constituted to be moved in forward and rearward directions by a hydraulic cylinder.

4. The sheet material loading and unloading apparatus according to claim 1, wherein the carriage is provided with a plurality of sensors for sensing an end surface of the sheet material; and the sensors are disposed in the carriage in such a manner as to be adjacent to a plurality of clamps disposed in the carriage.

5. The sheet material loading and unloading apparatus according to claim 1, further comprising:

a cover surrounding the upper frame disposed in the frame in such a manner as to freely move to a vertical direction.

6. The sheet material loading and unloading apparatus according to claim 5, wherein when the upper frame is not operated an upper surface of the cover is positioned below a pass line where the material or the processed product passes.

7. A sheet material loading and unloading method, in a sheet material loading and unloading apparatus comprising a frame having a lower frame and an upper frame attached to the lower frame in such a manner that the upper frame freely moves to a vertical direction, the frame is located in one side of a sheet material processing device, comprising the steps of:

providing a vertically movable lifter within the frame;

providing a truck going in and out over the lifter;

mounting and piling a plurality of pallets which support the material on the truck;

providing a plurality of escapable loading positioning members on the upper frame, the loading positioning members supporting a pallet disposed at a desired position by a vertical motion of the lifter among a plurality of piled pallets;

providing a plurality of escapable material supporting members supporting a pallet disposed immediately above the pallet at the desired position in the upper frame;

providing a plurality of clamps gripping the material to be processed in the sheet material processing device or the processed product which are mounted on the pallet supported by the loading positioning member, the clamps freely moving to a direction close to or apart from the sheet material processing device;

ascending the upper frame by the lifter and descending the lifter after fixing at a predetermined operating height at a time of loading the material mounted on the pallet to the sheet material processing device;

taking the truck supporting a plurality of pallets mounting the material within the frame;

ascending the pallet by the lifter, stopping the ascent of the lifter and supporting the pallet by the material supporting member when the pallet immediately above the pallet disposed at the lowermost step is moved at a position of the material supporting member;

supporting the lowermost pallet by the loading positioning member and gripping the material mounted on the lowermost pallet by the clamp disposed in a carriage so as to load to the sheet material processing device;

gripping the product by the clamp disposed in the carriage so as to unload at a time of unloading the processed product from the processing device side;

receiving the product within an empty pallet disposed at the lowermost step on the lifter; and successively loading and unloading a plurality of sheet materials in the same manner.

* * * * *